United States Patent [19]

Hodges

[11] Patent Number: 4,696,546

[45] Date of Patent: Sep. 29, 1987

[54] EXAMINING APPARATUS

[76] Inventor: Daryl H. Hodges, P.O. Box 1273, Big Timber, Mont. 59011

[21] Appl. No.: 865,805

[22] Filed: May 22, 1986

[51] Int. Cl.$^4$ .............................................. G02B 27/02
[52] U.S. Cl. .................................... 350/235; 350/239; 356/62
[58] Field of Search .............................. 350/235–239; 356/244, 62, 63, 64, 66; 362/29, 368

[56] References Cited

U.S. PATENT DOCUMENTS 3,410,635  11/1968  Lockwood .......................... 350/239
3,656,840  4/1972   Smith et al. ........................ 350/239

FOREIGN PATENT DOCUMENTS 21683  3/1935  Australia .............................. 356/62

Primary Examiner—John K. Corbin
Assistant Examiner—Loha Ben
Attorney, Agent, or Firm—Arthur L. Urban

[57] ABSTRACT

Examining apparatus includes a base portion, a telescoping portion, an illuminating portion, a power supplying portion and a specimen displaying portion. The base portion includes a bottom section and a first sidewall section extending upwardly therefrom. The telescoping portion includes a top section and a second sidewall section extending downwardly therefrom with the top section including a magnifying lens. The second sidewall section is of a size and configuration to provide adjustable overlapping engagement with the first sidewall section. The illuminating portion includes a first support member disposed within the base portion substantially parallel to the bottom section and spaced therefrom. The first support member includes a plurality of spaced first openings with a light emitting diode lamp disposed withing each first opening. The power supplying portion includes circuitry connecting the light emitting diode lamps electrically with a power source and mechanism for actuating the lamps. The circuitry is selectively engageable with the illuminating portion. The specimen displaying portion includes a second support member disposed within the base portion and resting on the illuminating portion. The second support member has major surfaces of the same general configuration as those of the first support member and a plurality of spaced second conical openings with one being aligned over each of the light emitting diode lamps.

19 Claims, 6 Drawing Figures

U.S. Patent     Sep. 29, 1987     4,696,546
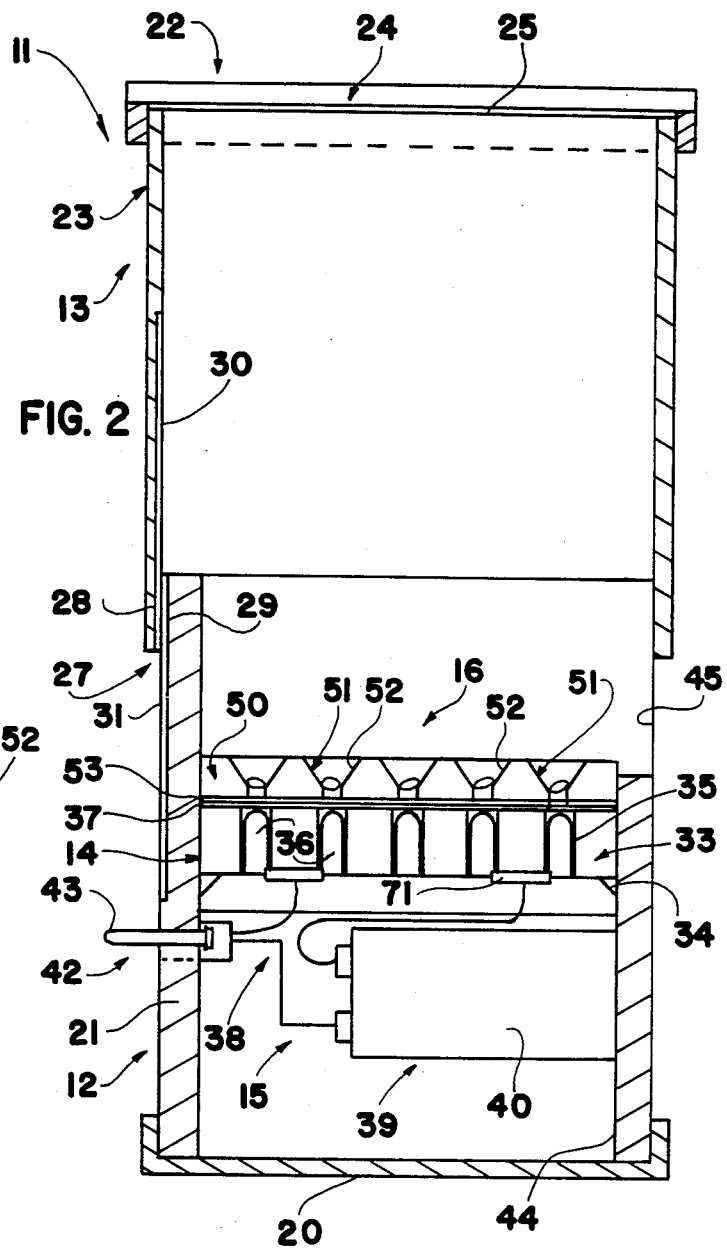
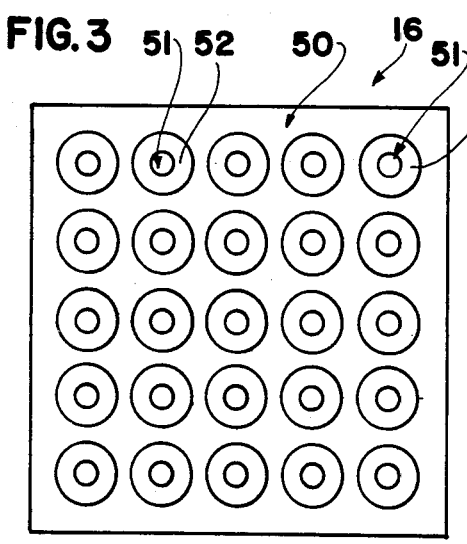
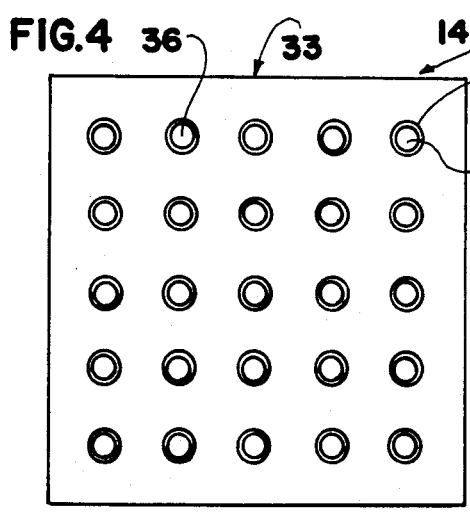
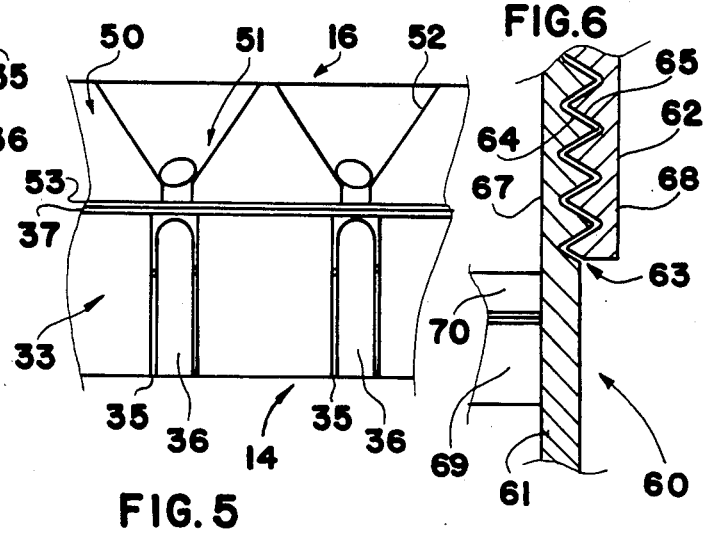

EXAMINING APPARATUS

This inventio relates to a novel examining apparatus and more particularly relates to a new apparatus for examining specimens.

Primitive man could only use his eyes when he wanted to examine objects or other specimens. Thus, his ability to examine very small objects was limited by his own visual acuity.

To overcome these limitations, microscopes and other magnifying devices were developed. With microscopes, very small specimens, much smaller in size than could be discerned with the human eye, could be examined easily. The only limiting factor was the magnification power of the lens employed. However, microscopes were useful only under laboratory like conditions since they had to be positioned on a stable surface in clean surroundings and provided with a good light source.

Where such conditions were not readily available such as in the field, it was customary to use, instead of a microscope, a simple magnifying lens which provided a degree of visual amplification. Even when using a magnifying lens, it still was necessary to hold the specimen in one's hand or balance it on a natural surface such as a log or rock. Also, the specimen must be positioned in the proper lighting conditions to bring out the desired features and characteristics. All of this necessitates considerable ingenuity, dexterity and experience.

In most situations encountered in the field, a scientist or a layman may have to compromise his expectations and settle for less than the optimum in terms of specimen lighting, display and the like. This compromise can be even greater for very small size specimens that cannot be handled conveniently and cannot be displayed and observed adequately.

For such specimens a magnifying lens may not be satisfacotry and it may be necessary to carry a microscope into the field and accept the limitations that are inherent with this instrument under such conditions. The microscope may have to be packed in, with its extra weight and bulk. Also, special care must be taken to prevent damage to this fragile instrument both from shock and also from dirt and weather.

One area of use in which previous magnifying devices have been less than satisfactory is in the examination of fish eggs by conservation management personnel. It is desirable to examine fish eggs in the field to determine first if the eggs are viable, later if they have been fertilized and finally how the embryos are growing. The very small size of the eggs makes this task especially difficult and time-consuming if any reasonable degree of accuracy is to be achieved.

From the above discussion, it is clear that present and past magnifying devices do not provide the capability and performance required in many field applications. Therefore, there is a need for a new apparatus that overcomes the shortcomings of earlier devices.

The present invention provides a novel examining apparatus that overcomes deficiencies of previous devices and in addition provides features and advantages not found in earlier devices. The examining apparatus of the invention enables one or a number of specimens to be examined under ideal lighting conditions quickly and easily. With the examining apparatus, a number of very small individual specimens can be examined in a single viewing. Likewise, comparisons between specimens being viewed can be made easily.

The examining apparatus of the present invention is simple in design and relatively inexpensive to produce. The apparatus can be fabricated from commercially available materials and components. Conventional assembly techniques and procedures performed by semi-skilled workers can be utilized in its manufacture.

The examining apparatus is small in size and can be carried into the field conveniently. It is durable in construction and has a long useful life with little if any maintenance.

The apparatus can be used efficiently by persons with limited aptitude and experience after a minimum of instruction. Display of specimens can be accomplished easily. The apparatus can be cleaned and prepared for sequential observation simply and quickly.

The examining apparatus of the invention can be used to accommodate and examine specimens of different sizes and shapes. Appropriate displaying and illuminating portions for the particular specimens can be interchanged quickly and conveniently.

These and other benefits and advantages of the novel examining apparatus of the present invention will be apparent from the following description and the accompanying drawings in which:

FIG. 1 is a view in perspective of one form of the examining apparatus of the invention in use;

FIG. 2 is an enlarged side view in section of the examining apparatus shown in FIG. 1;

FIG. 3 is a top view of the specimen displaying portion of the examining apparatus shown in FIG. 2;

FIG. 4 is a top view of the illuminating portion of the examining apparatus shown in FIG. 2;

FIG. 5 is an enlarged fragmentary side view of the displaying portion shown in FIGS. 2 and 3; and FIG. 6 is a fragmentary side view in section of another form of the examining apparatus of the invention.

As shown in the drawings, one form of the novel examining apparatus 11 of the present invention includes a base portion 12, a telescoping portion 13, an illuminating portion 14, a power supplying portion 15 and a specimen displaying portion 16.

The base portion 12 of the examining apparatus 11 includes a bottom section 20 and a first sidewall section 21 that extends upwardly from the bottom section. Advantageously, the sidewall section 21 is of a quadrangular cross section as shown.

The telescoping portion 13 of the examining apparatus 11 of the invention includes a top section 22 and a second sidewall section 23 that extends downwardly from the top section. The top section 22 includes a magnifying lens 24. The magnifying lens 24 preferably is a transparent plastic plate 25 that constitutes the entire top section.

The second sidewall section 23 is of a size and configuration to provide adjustable overlapping with the first sidewall section 21 of the base portion 12. Advantageously, the telescoping portion 13 has a cross section slightly larger than that of the base portion.

Means 27 are disposed between overlapping surfaces 28 and 29 of the first and second sidewall sections 21 and 23 to maintain the selected positioning of the first and second sections with respect to one another. The position maintaining means 27 between the overlapping surfaces 28 and 29 preferably includes a magnetic strip combination with strips 30 and 31.

The illuminating portion 14 of the examining apparatus 11 includes a first support member 33. This first support member is disposed within the base portion 12 in a position substantially parallel to the bottom section 20 and resting on internal supports 34.

The first support member 33 includes a plurality of first spaced openings 35. A light emitting diode lamp 36 is disposed within each first opening 35. The first spaced openings 35 advantageously are substantially uniformly distributed over a major surface of the first support member.

The light emitting diode lamps 36 preferably are secured within the first openings 35. Most advantageously, upper ends of the first openings of the illuminating portion are sealed such as with a plate or film 37 secured to the upper face of the first support member.

The power supplying portion 15 of the apparatus 11 of the present invention includes circuitry 38 connecting the light emitting diode lamps 36 with a power source 39. The power source preferably includes a battery 40. Means 42 are provided for actuating the lamps, advantageously a switch 43. The lamps 36 preferably are connected to each other in series-parallel.

The circuitry 38 is selectively engageable with the illuminating portion 14. Advantageously, the illuminating portion is selectively separable from the power supplying portion and also from the base portion.

To facilitate this selective engagement and separation, the base portion advantageously includes a first access opening 44 below the illuminating portion. Preferably, the first access opening 44 includes a removable bottom section 20. The base portoin advantageously further includes a second access opening 45 in the first sidewall section 21 adjacent to the illuminating portion. This second access opening preferably includes a cutout in the first sidewall 21 adjacent the illuminating portion.

The specimen displaying portion 16 of the examining apparatus 11 of the inventio includes a second support member 50 that is disposed within the base portion 12. The second support member 50 rests on the illuminating portion 14. The second support member 50 has major surfaces of the same general configuration as those of the first support member 33.

The second support member 50 includes a plurality of second spaced openings 51. One of the second openings 51 is aligned vertically over each of the light emitting diode lamps 36 of the illuminating portion. Each of the second openings 51 in the second support member includes a downwardly converging conical section 52. Advantageously, lower ends of the second openings are sealed. This sealing preferably is accomplished with a plate or film 53 secured to the lower surface of the displaying portion.

FIG. 6 illustrates another form of examining apparatus 60 of the present invention. As shown in the fragmentary view, a base portion 61 and telescoping portion 62 are cylindrical in configuration. This circular cross section construction enables position maintaining means 63 to include mating threaded sections 64 and 65 in overlapping surfaces 67 and 68 of the respective portions. These threaded sections facilitate adjustment of the position of the base portion and the telescoping portion with respect to each other. Illuminating portion 69 and specimen displaying portion 70 may be circular in shape also.

The examining apparatus 11 of the present invention may be fabricated from any of a variety of different materials. For example, metals, plastics, glass, wood and combinations thereof may be utilized depending upon the particular types of specimens being examined.

In the use of the novel examining apparatus of the invention, a combination of illuminating portion and displaying portion is selected with the desired arrangement of first and second openings for the specimens to be examined. These components are positioned within the base portion by moving the telescoping portion into an extended position with respect to the base portion or by completely separating these portions.

Next, the selected illuminating portion is positioned within the base portion to rest on the internal peripheral supports 34. Connections to the circuitry 38 are made through contacts 71. To facilitate access to the underside of the first support member 33, the bottom section 20 may be removable from the base portion.

The specimen displaying portion 16 while separated from the base portion or after being positioned therein can be loaded with the desired specimens such as fish eggs by placing single eggs into the second openings 51 of the second support member 50. The support member is placed on top of the first support member 33 with the second openings being aligned over light emitting diode lamps 36. Switch 43 is actuated causing the light emitting diode lamps 36 to be illuminated.

Thereafter, the telescoping portion 13 is moved downwardly with respect to the base portion until the fish eggs can be seen clearly through the magnifying lens 24. Since the openings 51 are conical, the eggs placed therein will slide down to the lower end thereof and automatically be centered.

The eggs can be examined for viability, fertilization and/or embryo growth quickly and conveniently. Also, the condition of one egg can be compared simultaneously with other eggs being examined without changing the specimens. When the examination has been completed, the displaying support member 50 can be removed from the base portion, the specimens flushed away and new specimens loaded for the next examination.

During and/or prior to the examination, the specimens can be treated with various materials such as reagents, diluents and the like. Such treatments can modify or enhance the appearance of the specimens to facilitate the examination thereof.

Through the use of the examining apparatus of the present invention, specimens may be examined quickly and easily under ideal lighting conditions. This can be accomplished even in the field. The apparatus is useful both for single specimens and especially for the simultaneous examination and comparison of a number of specimens in a single viewing.

The examining apparatus is simple in design and small in size so it can be carried into the field easily. The apparatus can be fabricated from commercially available inexpensive materials and components using conventional manufacturing techniques.

The examining apparatus of the invention can be used with many different specimens of various sizes and shapes. The displaying and illuminating portions can be interchanged easily and quickly to accommodate particular specimens.

Persons of limited aptitude and experience can use the apparatus efficiently after a minimum of instruction. The apparatus is durable in construction and requires little if any maintenance. Specimens can be positioned and removed quickly and the apparatus cleaned easily for subsequent viewing.

It will be apparent that various modifications can be made in the particular examining apparatus described in detail above and shown in the drawings within the scope of the present invention. The size, configuration and arrangement of components can be changed for specific requirements and specimens. The number and placement of the specimen holding openings can be different as well as the circuitry connecting the lamps.

The means for holding the relative position of the telescoping and base portions can be roughened or adhesive surfaces that rely solely on frictional contact. Also, accessories such as filters, counters and the like can be addedd to the apparatus as desired. These and other changes can be made in the examining apparatus of the invention provided the functioning and operation thereof are not adversely affected. Therefore, the scope of the present invention is to be limited only by the following claims.

What is claimed is:

1. Examining apparatus including a base portion, a telescoping portion, an illuminating portion, a power supplying portion and a specimen displaying portion; said base portion including a bottom section and a first sidewall section extending upwardly therefrom; said telescoping portion including a top section and a second sidewall section extending downwardly therefrom, said top section including a magnifying lens, said second sidewall section being of a size and configuration to provide adjustable overlapping engagement with said first sidewall section of said base portion, means disposed between overlapping surfaces of said first and second sidewall sections maintaining the positioning therebetween; said illuminating portion including a first support member disposed within said base portion substantially parallel to said bottom section and spaced therefrom, said support member including a plurality of spaced first openings, a light emitting diode lamp disposed within each first opening; said power supplying portion including circuitry connecting said light emitting diode lamps electrically with a power source, means for actuating said lamps, said circuitry being selectively engageable with said illuminating portion; said specimen displaying portion including a second support member disposed within said base portion and resting on said illuminating portion, said second support member having major surfaces of the same general configuration as those of said first support member, said second support member including a plurality of spaced second openings, one of said second openings being aligned over each of said light emitting diode lamps of said illuminating portion, each of said second openings in said second support member including a converging conical section; whereby specimens positioned in said conical sections of said displaying portion can be examined through said magnifying lens as illuminated by said lamps disposed therebelow.

2. Examining apparatus according to claim 1 wherein said base portion includes an access opening below said illuminating portion.

3. Examining apparatus according to claim 2 wherein said access opening includes a removable bottom section.

4. Examining apparatus according to claim 1 wherein said base portion includes an access opening adjacent said displaying and illuminating portions.

5. Examining apparatus according to claim 4 wherein said access opening includes a cutout in said sidewall section.

6. Examining apparatus according to claim 1 wherein said base portion has a quadrangular cross section.

7. Examining apparatus according to claim 1 wherein said base portion has a circular cross section.

8. Examining apparatus according to claim 1 wherein said telescoping portion has a cross section slightly larger than that of said base portion.

9. Examining apparatus according to claim 1 wherein said magnifying lens includes a transparent plastic plate.

10. Examining apparatus according to claim 1 wherein said position maintaining means between said overlapping surfaces of said first and second sidewall sections includes a magnetic strip combination.

11. Examining apparatus according to claim 1 wherein said position maintaining means between said overlapping surfaces of said first and second sidewall sections includes mating threaded sections.

12. Examining apparatus according to claim 1 wherein said spaced first openings of said illuminating portion are substantially uniformly distributed over a major surface of said first support member.

13. Examining apparatus according to claim 1 wherein said light emitting diode lamps are secured within said spaced first openings.

14. Examining apparatus according to claim 1 wherein said illuminating portion is selectively separable from said base portion and said power supplying portion.

15. Examining apparatus according to claim 1 wherein upper ends of said spaced first openings of said illuminating portion are sealed.

16. Examining apparatus according to claim 1 wherein lower ends of said spaced second openings of said displaying portion are sealed.

17. Examining apparatus according to claim 1 wherein said power source of said power supplying portion includes a battery.

18. Examining apparatus according to claim 1 wherein said lamp actuating means of said power supplying portion includes a switch.

19. Examining apparatus according to claim 1 wherein said light emitting diode lamps are connected in series-parallel.

* * * * *